(12) United States Patent
Goodman et al.

(10) Patent No.: US 12,277,083 B2
(45) Date of Patent: Apr. 15, 2025

(54) TIME SYNCHRONIZATION DEVICE FOR PROVIDING TIMING INFORMATION ACQUIRED FROM NETWORK TIME SOURCES TO ENDPOINT DEVICES

(71) Applicant: Dell Products L.P., Round Rock, TX (US)

(72) Inventors: Bradley K. Goodman, Nashua, NH (US); Christian Lita, Dripping Springs, TX (US)

(73) Assignee: Dell Products L.P., Round Rock, TX (US)

( * ) Notice: Subject to any disclaimer, the term of this patent is extended or adjusted under 35 U.S.C. 154(b) by 571 days.

(21) Appl. No.: 17/831,577

(22) Filed: Jun. 3, 2022

(65) Prior Publication Data
US 2023/0393608 A1 Dec. 7, 2023

(51) Int. Cl.
*G06F 13/38* (2006.01)
*G06F 1/14* (2006.01)
*G06F 21/60* (2013.01)
*H04J 3/06* (2006.01)

(52) U.S. Cl.
CPC .............. *G06F 13/385* (2013.01); *G06F 1/14* (2013.01); *G06F 21/602* (2013.01); *G06F 21/606* (2013.01); *H04J 3/0667* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 9,177,122 B1 * | 11/2015 | Trier | G06F 8/65 |
| 10,944,818 B1 * | 3/2021 | Izenberg | H04J 3/14 |
| 2007/0178921 A1 * | 8/2007 | Cutler | G01S 5/0226 |
| | | | 455/502 |

(Continued)

OTHER PUBLICATIONS

Synchronizing ntpd to a Garmin GPS 18LVC via gpsd (Year: 2017).*

(Continued)

*Primary Examiner* — Christopher T Wyllie
(74) *Attorney, Agent, or Firm* — Ryan, Mason & Lewis, LLP

(57) ABSTRACT

An apparatus comprises a processing device configured to establish a first connection to a specified network time source via a network-connected device, and to acquire first timing information from the specified network time source via the network-connected device, the first timing information comprising a current time value and first accuracy information for the specified network time source. The processing device is also configured to set and maintain an internal real-time clock based on the current time value. The processing device is further configured to establish a second connection to an endpoint device and to provide second timing information to the endpoint device, the second timing information comprises a current time measurement of the internal real-time clock and second accuracy information for the internal real-time clock, the second accuracy information for the internal real-time clock being based on the first accuracy information for the specified network time source.

20 Claims, 8 Drawing Sheets

(56) References Cited

U.S. PATENT DOCUMENTS

| | | | |
|---|---|---|---|
| 2009/0051527 A1* | 2/2009 | Au | G07C 1/10 340/539.13 |
| 2009/0222685 A1* | 9/2009 | Foster | G06F 1/14 713/400 |
| 2011/0110360 A1* | 5/2011 | Fenwick | G06F 1/14 370/350 |
| 2011/0222561 A1* | 9/2011 | Alley | G04R 20/00 370/503 |
| 2013/0085904 A1* | 4/2013 | Menon | G06Q 10/06 705/30 |
| 2014/0108491 A1* | 4/2014 | Fan | H04L 63/108 709/201 |
| 2015/0346760 A1* | 12/2015 | Kishiro | G06F 1/10 713/503 |
| 2016/0110467 A1* | 4/2016 | Hern | H04L 67/535 235/375 |
| 2016/0125669 A1* | 5/2016 | Meyer | G07C 5/0808 701/31.5 |
| 2018/0063365 A1* | 3/2018 | Kasai | G06F 3/1236 |
| 2018/0107626 A1* | 4/2018 | Shao | G06F 13/4295 |
| 2018/0132285 A1* | 5/2018 | Jackson | H04W 76/10 |
| 2018/0152343 A1* | 5/2018 | Bettendorff | H04L 41/0806 |
| 2018/0182182 A1* | 6/2018 | Meyer | G07C 5/085 |
| 2020/0041633 A1* | 2/2020 | Torfs | G01S 11/14 |
| 2020/0412470 A1* | 12/2020 | Choudhary | H04L 61/5014 |
| 2021/0229716 A1* | 7/2021 | Carlson | B61L 1/08 |
| 2022/0272536 A1* | 8/2022 | Anderson | H04W 12/61 |
| 2023/0067617 A1* | 3/2023 | Riley | H04W 4/029 |
| 2023/0315144 A1* | 10/2023 | Ma | G06F 1/14 713/400 |

OTHER PUBLICATIONS

K. O'Donoghue et al., "New Security Mechanisms for Network Time Synchronization Protocols," 2017 IEEE International Symposium on Precision Clock Synchronization for Measurement, Control, and Communication, Aug. 2017, 6 pages.

T. Rytilahti et al., "Masters of Time: An Overview of the NTP Ecosystem," 2018 IEEE European Symposium on Security and Privacy, Apr. 2018, 15 pages.

P. H. Dana, "Global Positioning System (GPS) Time Dissemination for Real-Time Applications," Real-Time Systems, vol. 12, No. 1, Dec. 1997, pp. 9-40.

D. L. Mills, "Internet Time Synchronization: the Network Time Protocol," IEEE Transactions on Communications, vol. 39, No. 10, Oct. 1991, 14 pages.

G. W. Huang et al., "Real-time Clock Offset Prediction with an Improved Model," GPS Solutions, vol. 18, Feb. 13, 2013, pp. 95-104.

* cited by examiner

TIME SYNCHRONIZATION DEVICE FOR PROVIDING TIMING INFORMATION ACQUIRED FROM NETWORK TIME SOURCES TO ENDPOINT DEVICES

FIELD

The field relates generally to information processing, and more particularly to management of information processing systems.

BACKGROUND

Accurate and reliable timing information is important for various tasks performed on computing devices. As an example, computing devices may utilize cryptographic certificates for various security operations. Cryptographic certificates are typically issued with an expiration date for security purposes, and thus having accurate and reliable timing information on a computing device is necessary for determining validity of cryptographic certificates. As another example, accurate and reliable timing information is important for determining the ordering of transactions, for event management (e.g., determining when users log into and out of computing devices), for attesting to latency measurements, etc. For computing devices which are not connected to the Internet, it is difficult to securely establish and maintain accurate and reliable timing information.

SUMMARY

Illustrative embodiments of the present disclosure provide techniques for providing timing information acquired from network time sources to endpoint devices.

In one embodiment, an apparatus comprises at least one processing device comprising a processor coupled to a memory. The at least one processing device is configured to perform the steps of establishing a first connection to a specified network time source via a network-connected device that the at least one processing device is coupled to and acquiring first timing information from the specified network time source via the network-connected device, the first timing information comprising a current time value and first accuracy information for the specified network time source. The at least one processing device is also configured to perform the steps of setting an internal real-time clock of the at least one processing device based at least in part on the current time value included in the first timing information and maintaining, subsequent to decoupling of the at least one processing device from the network-connected device, the internal real-time clock of the at least one processing device. The at least one processing device is further configured to perform the steps of establishing a second connection to an endpoint device and providing, to the endpoint device, second timing information, the second timing information comprises a current time measurement of the internal real-time clock of the at least one processing device and second accuracy information for the internal real-time clock of the at least one processing device, the second accuracy information for the internal real-time clock of the at least one processing device being based at least in part on the first accuracy information for the specified network time source.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
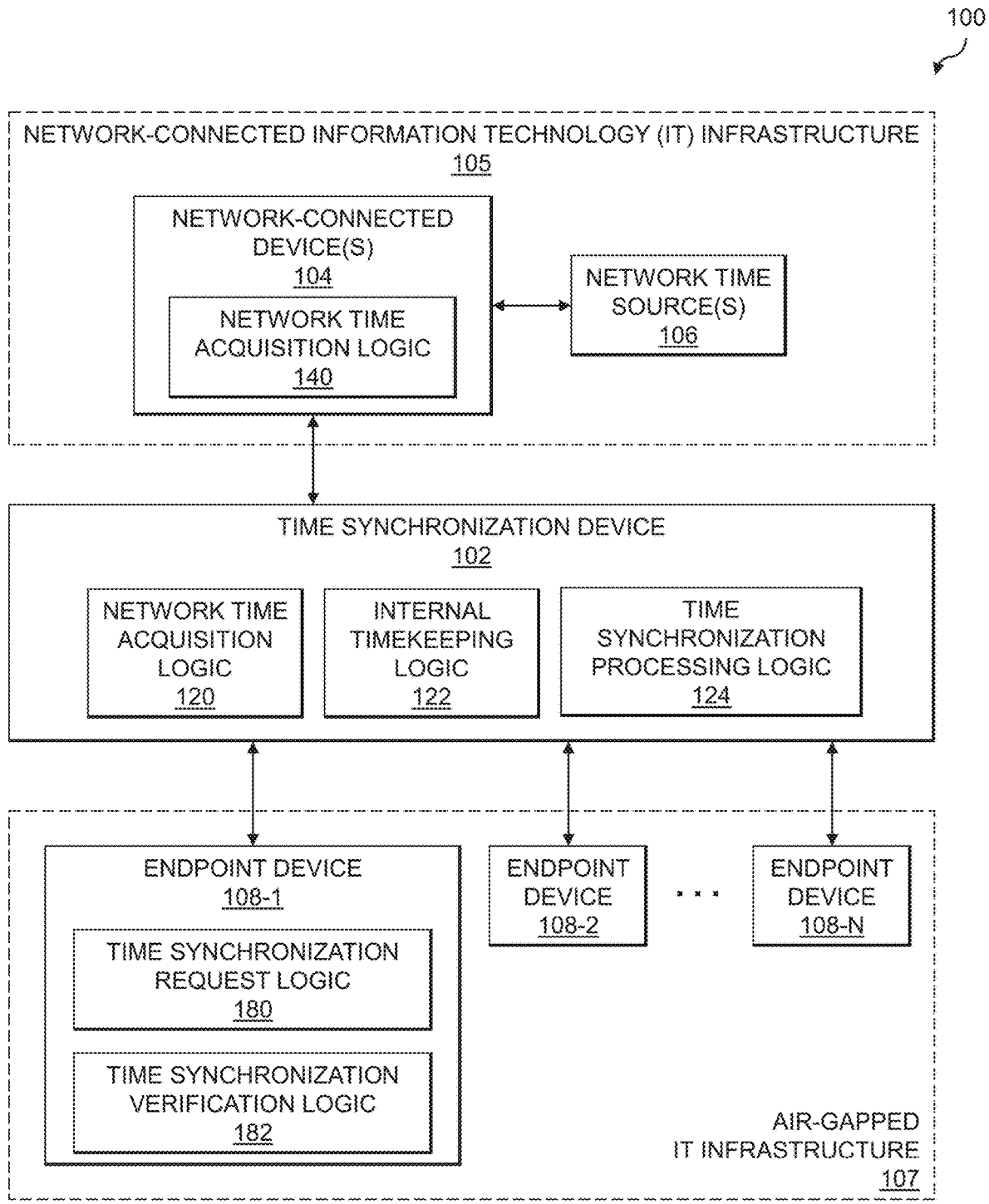
FIG. 1 is a block diagram of an information processing system configured for providing timing information acquired from network time sources to endpoint devices in an illustrative embodiment.

FIG. 1 shows an information processing system 100 configured in accordance with an illustrative embodiment. The information processing system 100 is assumed to be built on at least one processing platform and provides functionality for secure offline time synchronization. The system 100 includes a time synchronization device 102, a network-connected information technology (IT) infrastructure 105 including one or more network-connected devices 104 and one or more network time sources 106, and an air-gapped IT infrastructure 107 including a set of endpoint devices 108-1, 108-2, . . . 108-N (collectively, endpoint devices 108). The network-connected devices 104, network time sources 106 and endpoint devices 108 are examples of IT assets of the network-connected IT infrastructure 105 and the air-gapped IT infrastructure 107. Although shown as separate in FIG. 1, it should be appreciated that the network-connected IT infrastructure 105 and the air-gapped IT infrastructure 107 may be part of the same IT infrastructure. For example, a particular IT infrastructure may include some devices which are network-connected and others which are air-gapped.

Having a reliable time source so that the time-basis of a given machine (e.g., one of the endpoint devices 108) is in synchronization with others is important for various reasons, including for security. Many security measures, such as handling of cryptographic certificates, use methods such as expiration dates as part of their security policies. Having endpoint devices 108 with compromised time sources is therefore not just an inconvenience, but is also a security risk. Various approaches may be used to counter these technical problems. Such approaches include, but are not limited to, use of network protocols such as Network Time Protocol (NTP), using Global Positioning System (GPS) time sources, etc. These approaches, however, can be intercepted or spoofed to give the endpoint devices 108 incorrect timing information. Thus, standards have emerged to use Transport Layer Security (TLS) in conjunction with NTP so that timing information will only be used from cryptographically proven trusted time sources (e.g., trusted ones of the network time sources 106). In cases where the endpoint devices 108 are offline and disconnected from a greater network (e.g., are part of the air-gapped IT infrastructure 107), the network time sources 106 may not be available directly (e.g., as the endpoint devices 108 cannot establish network connectivity to the network time sources 106). Endpoint devices 108 may be part of the air-gapped IT infrastructure 107 for various reasons, such as logistics in connectivity or design, for explicit security purposes, etc.

The time synchronization device 102, as will be described in further detail below with respect to FIGS. 2A and 2B, may be a small microprocessor-controller Universal Serial Bus (USB) device which maintains a Real-Time Clock (RTC) which is battery powered. The time synchronization device 102 can thus can maintain accuracy even when unplugged or disconnected from any other device (e.g., disconnected from the network-connected devices 104 and endpoint devices 108). The time synchronization device 102 may maintain its own public/private key pair (e.g., a "Device Key Pair") that can be generated automatically by the time synchronization device 102, upon factory initialization of the time synchronization device 102, etc. The private key of the Device Key Pair is not read outside of the time synchronization device 102. The time synchronization device 102 also holds a certificate or other cryptographically signed message (e.g., a "Device Attestation Certificate"). The Device Attestation Certificate may be signed using a well-known key from a manufacturer of the time synchronization device 102, and may include the public key from the time synchronization device 102's Device Key Pair. Thus, the Device Attestation Certificate may be used to attest that any message signature verified to the public key of the time synchronization device 102's Device Key Pair came from a genuine device from a particular manufacturer.

The time synchronization device 102 also implements various software components or logic, including network time acquisition logic 120, internal timekeeping logic 122 and time synchronization processing logic 124. The network time acquisition logic 120 may implement an "acquisition application" that runs in conjunction with network time acquisition logic 140 on network-connected devices 104 to acquire timing information (e.g., a current time value that can be supplied to the endpoint devices 108). The internal timekeeping logic 122 implements functionality for maintaining timing information acquired from the network time sources 106 via the network-connected devices 104 when the time synchronization device 102 is disconnected from the network-connected devices 104. The time synchronization processing logic 124 provides a "delivery application" that works in conjunction with time synchronization request logic 180 and time synchronization verification logic 182 in order to synchronize timing information on the endpoint device 108-1. Although not shown in FIG. 1, other ones of the endpoint devices 108-2 through 108-N are assumed to similarly implement respective instances of time synchronization request logic 180 and time synchronization verification logic 182. The time synchronization processing logic 124 works to read current timing information of the time synchronization device 102 (e.g., as maintained by the internal timekeeping logic 122) in response to requests from the time synchronization request logic 180 of the endpoint device 108-1, and provides the current timing information to the endpoint device 108-1. The time synchronization verification logic 182 verifies the authenticity of the time synchronization device 102 and the current timing information received therefrom, and for setting a local system time of the endpoint device 108-1 based on successfully verifying the current timing information received from the time synchronization device 102.

The time synchronization device 102 is configured for connection to both the network-connected devices 104 and the endpoint devices 108. For example, the time synchronization device 102 may be connected at a first time to one of the network-connected devices 104 so as to obtain timing information (e.g., one or more network times or time measurements, such as RTC values) from one or more of the network time sources 106 (via the network-connected devices 104) using the network time acquisition logic 120 and the network time acquisition logic 140. The time synchronization device 102 utilizes the internal timekeeping logic 122 to maintain the timing information (e.g., the time measurements such as RTC values) after the time synchronization device 102 is disconnected from the network-connected devices 104. The internal timekeeping logic 122 is further configured to monitor for any events (e.g., failure of a battery of the time synchronization device 102) which invalidate the maintained timing information.

Once the timing information is obtained and suitably verified, the time synchronization device 102 can utilize the time synchronization processing logic 124 to provide the timing information to one or more of the endpoint devices 108 (e.g., to synchronize time measurements or RTC values thereof). In this way, the endpoint devices 108 which are air-gapped (e.g., not having a connection to the network time sources 106) can synchronize their time in an offline manner via the time synchronization device 102. For example, endpoint device 108-1 utilizes time synchronization request logic 180 to request current timing information from the time synchronization device 102 connected thereto, and utilizes the time synchronization verification logic 182 to verify the current timing information received from the time synchronization device 102.

In some embodiments, the time synchronization device 102 is used for an enterprise system. For example, an enterprise may subscribe to or otherwise utilize the time synchronization device 102 to manage a set of air-gapped IT assets (e.g., the endpoint devices 108 of the air-gapped IT infrastructure 107) operated by that enterprise. As used herein, the term "enterprise system" is intended to be construed broadly to include any group of systems or other computing devices. For example, the air-gapped IT infrastructure 107 may provide a portion of one or more enterprise systems. A given enterprise system may also or alternatively include one or more of the network-connected devices 104 and/or network time sources 106 of the network-connected IT infrastructure 105. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The time synchronization device 102, the network-connected devices 104, the network time sources 106 and the endpoint devices 108 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The processing devices may also or alternately comprise virtualized computing resources, such as virtual machines (VMs), containers, etc.

The time synchronization device 102, the network-connected devices 104, the network time sources 106 and the endpoint devices 108 in some embodiments comprise respective computers associated with a particular company, organization or other enterprise. Thus, the time synchronization device 102, the network-connected devices 104, the network time sources 106 and the endpoint devices 108 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

Although not explicitly shown in FIG. 1, one or more input-output devices such as keyboards, displays or other types of input-output devices may be used to support one or more user interfaces to the time synchronization device 102, as well as to support communication between the time synchronization device 102 and other related systems and devices not explicitly shown.

In some embodiments, the time synchronization device 102 is assumed to be associated with a system administrator, IT manager or other authorized personnel responsible for managing the endpoint devices 108 of the air-gapped IT infrastructure 107 (e.g., where such management includes securely synchronizing timing information for the endpoint devices 108). In some embodiments, the endpoint devices 108 of the air-gapped IT infrastructure 107 are owned or operated by the same enterprise that operates the time synchronization device 102 (e.g., where an enterprise such as a business provides timing information synchronization support for the assets it operates). In other embodiments, the endpoint devices 108 of the air-gapped IT infrastructure 107 may be owned or operated by one or more enterprises different than the enterprise which operates the time synchronization device 102 (e.g., a first enterprise provides time synchronization support for assets that are owned by multiple different customers, business, etc.). Various other examples are possible.

The time synchronization device 102, the network-connected devices 104, the network time sources 106 and the endpoint devices 108 in the FIG. 1 embodiment are assumed to be implemented using at least one processing device. Each such processing device generally comprises at least one processor and an associated memory, and implements one or more functional modules or logic for controlling certain features of the time synchronization device 102, the network-connected devices 104, the network time sources 106 and the endpoint devices 108 (e.g., the network time acquisition logic 120 and 140, internal timekeeping logic 122, time synchronization processing logic 124, time synchronization request logic 180 and time synchronization verification logic 182).

It is to be appreciated that the particular arrangement of the time synchronization device 102, the network-connected devices 104, the network time sources 106 and the endpoint devices 108 illustrated in the FIG. 1 embodiment is presented by way of example only, and alternative arrangements can be used in other embodiments. As discussed above, for example, one or more of the endpoint devices 108 may in some embodiments be part of the network-connected IT infrastructure 105 rather than the air-gapped IT infrastructure 107. As another example, the time synchronization device 102 may be one of the endpoint devices 108, where that endpoint device 108 may at some times be part of the network-connected IT infrastructure 105 and at other times be part of the air-gapped IT infrastructure 107. As another example, the functionality associated with the network time acquisition logic 120 and 140, the internal timekeeping logic 122, the time synchronization processing logic 124, the time synchronization request logic 180 and the time synchronization verification logic 182 may be combined, or separated across more modules or logic with the multiple modules or logic possibly being implemented with multiple distinct processors or processing devices. Further, at least portions of the functionality of the network time acquisition logic 120 and 140, the internal timekeeping logic 122, the time synchronization processing logic 124, the time synchronization request logic 180 and the time synchronization verification logic 182 may be implemented in different ones of the time synchronization device 102, the network-connected devices 104, the network time sources 106 and the endpoint devices 108, or at least partially in multiple ones of the time synchronization device 102, the network-connected devices 104, the network time sources 106 and the endpoint devices 108.

At least portions of the network time acquisition logic 120 and 140, the internal timekeeping logic 122, the time synchronization processing logic 124, the time synchronization request logic 180 and the time synchronization verification logic 182 may be implemented at least in part in the form of software that is stored in memory and executed by a processor.

Various portions of the system 100, such as the network-connected devices 104 and the network time sources 106 of the network-connected IT infrastructure 105, as will be described in further detail below, may be part of cloud infrastructure.

The time synchronization device 102, the network-connected devices 104, the network time sources 106, the endpoint devices 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The time synchronization device 102, the network-connected devices 104, the network time sources 106 and the endpoint devices 108 or components thereof (e.g., the network time acquisition logic 120 and 140, the internal timekeeping logic 122, the time synchronization processing logic 124, the time synchronization request logic 180 and the time synchronization verification logic 182) may be implemented on respective distinct processing platforms, although numerous other arrangements are possible. For example, in some embodiments at least portions of the network-connected devices 104 and the network time sources 106 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the network-connected IT infrastructure 105 and the air-gapped IT infrastructure 107, or portions or components thereof, to reside in different data centers. Numerous other distributed implementations are possible. The time synchronization device 102, the network-connected devices 104, the network time sources 106 and the endpoint devices 108 can also be implemented in a distributed manner across multiple data centers.

Additional examples of processing platforms utilized to implement the time synchronization device 102, the network-connected devices 104, the network time sources 106, the endpoint devices 108 and other components of the system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for providing timing information acquired from network time sources to endpoint devices is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2A:
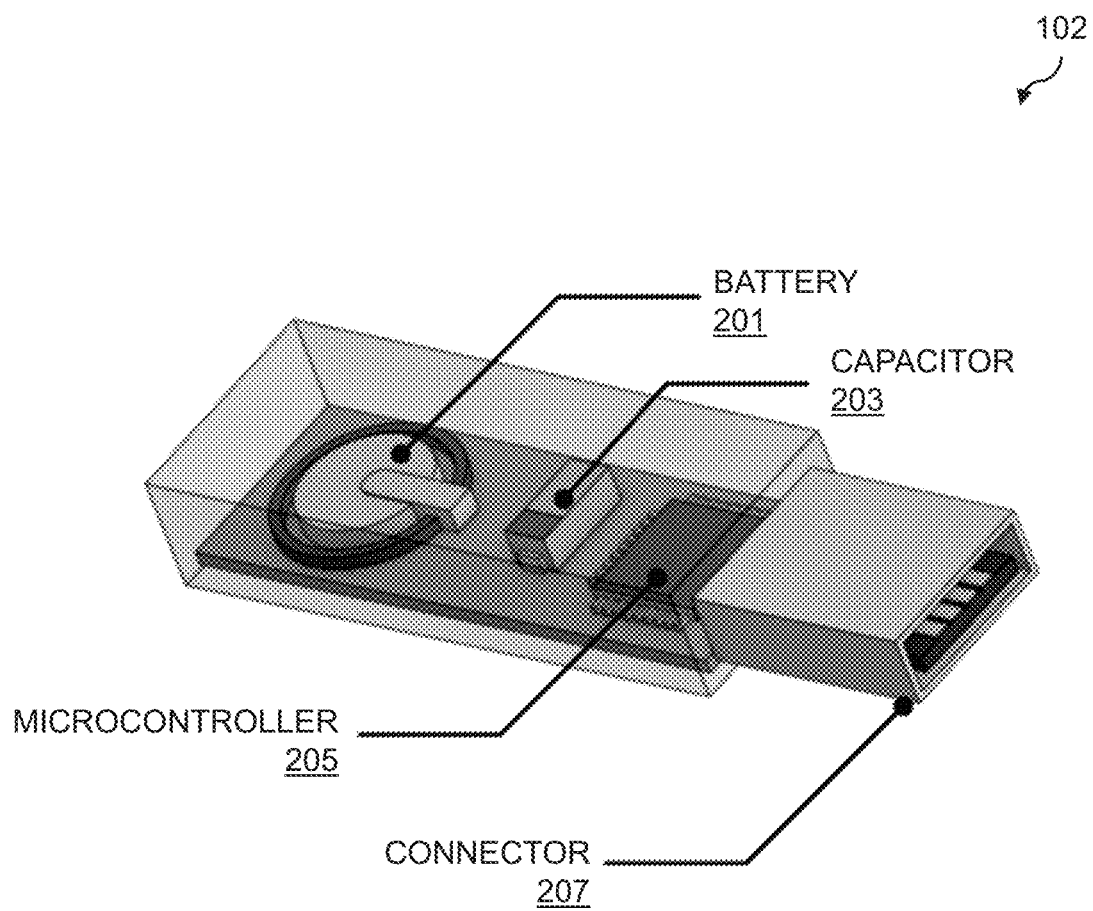
FIGS. 2A and 2B shows example hardware implementations of a time synchronization device in an illustrative embodiment.

FIG. 2A shows an example hardware implementation of the time synchronization device 102, where the time synchronization device 102 includes a battery 201, a capacitor 203, a microcontroller 205 and a connector 207. The battery 201 is used to keep a RTC in the time synchronization device 102 running when the time synchronization device is removed from a host (e.g., where the connector 207 is "unplugged" from the host). The host may comprise an "acquisition" device (e.g., one of the network-connected devices 104) or a "target" device (e.g., one of the endpoint devices 108). The capacitor 203 is used to at least momentarily maintain power to the microcontroller 205 after disconnection of the connector 207 from the host. In some embodiments, the capacitor 203 may be used in place of the battery 201 (e.g., where the capacitor 203 has sufficient charge capacity to keep the RTC of the time synchronization device 102 running for some threshold period of time, such as one day). The microcontroller 205 implements logic for maintaining the RTC and for controlling the connector 207. The logic may include, for example, the network time acquisition logic 120, the internal timekeeping logic 122 and the time synchronization processing logic 124. The connector 207 enables the time synchronization device 102 to interface with a host (e.g., an acquisition or target device). In some embodiments, the connector 207 comprises a USB connector. In other embodiments, various other types of connectors may be used.

Figure 2B:
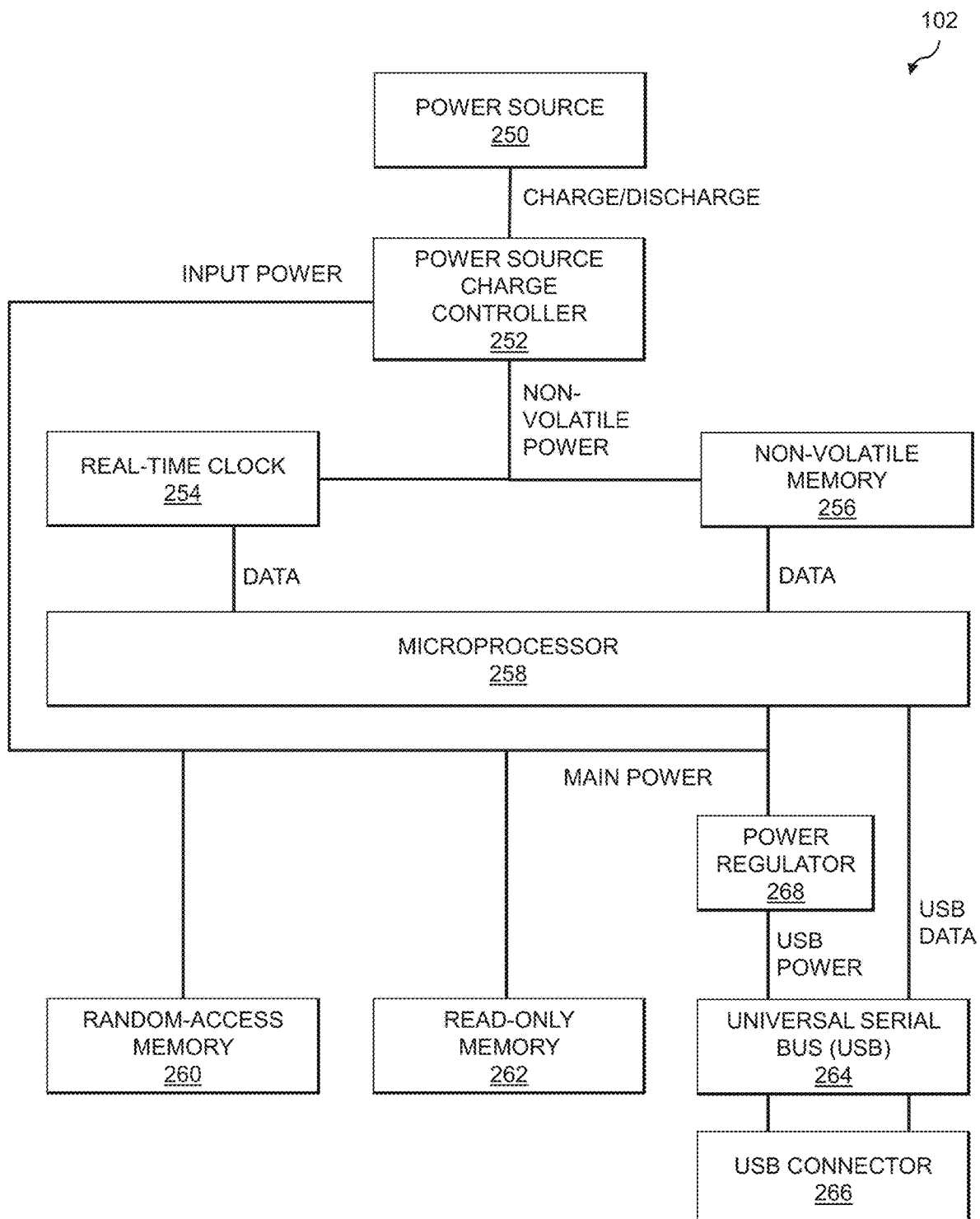

FIG. 2B shows an example circuit architecture for the time synchronization device 102. In the circuit architecture of FIG. 2B, the time synchronization device 102 includes a power source 250, a power source charge controller 252, a RTC 254, a non-volatile memory 256, a microprocessor 258, a random-access memory 260, a read-only memory 262, a USB 264, a USB connector 266 and a power regulator 268. The time synchronization device 102 in this embodiment is assume to receive USB power via the USB connector 266 and USB 264, which the power regulator 268 distributes as main power to the random-access memory 260, the read-only memory 262, and the power source charge controller 252. The main power provided to the power source charge controller 252 is also referred to as the input power of the time synchronization device 102. The time synchronization device 102 further exchanges USB data between the microprocessor 258 and a connected device (e.g., one of the network-connected devices 104 or one of the endpoints 108) via the USB connector 266 and USB 264. The USB data may include, for example, timing information (e.g., received from network-connected devices 104 or provided to endpoint devices 108). Different portions of the timing information may be stored in the random-access memory 260, the non-volatile memory 256 and the RTC 254. The read-only memory 262 may store various information, such as cryptographic key pairs, that are used in timing information acquisition and synchronization as described elsewhere herein.

The microprocessor 258 exchanges data with the RTC 254 and non-volatile memory 256. The power source charge controller 252 provides non-volatile power to the RTC 254 and the non-volatile memory 256 (e.g., such that timing information or data stored therein is maintained even when the timing synchronization device 102 is disconnected from any other device). When the timing synchronization device 102 is connected to another device (e.g., one of the network-connected devices 104 or one of the endpoints 108) via the USB connector 266, USB power from that device supplies the main or input power to the power source charge controller 252, which in turn provides non-volatile power to the RTC 254 and the non-volatile memory 256 and also charges the power source 250. The power source 250 may be any combination of one or more batteries, capacitors and super-capacitors. When the timing synchronization device 102 is not connected to another device (e.g., such that no USB power is being received via the USB connector 266), the power source 250 discharges to provide the non-volatile power supplied from the power source charge controller 252 to the RTC 254 and the non-volatile memory 256. It should be appreciated that the circuit architecture shown in FIG. 2B is presented by way of example only. In other embodiments, for example, one or more of the components shown in FIG. 2B may be combined into a single part (e.g., a microcontroller).

Figure 3:
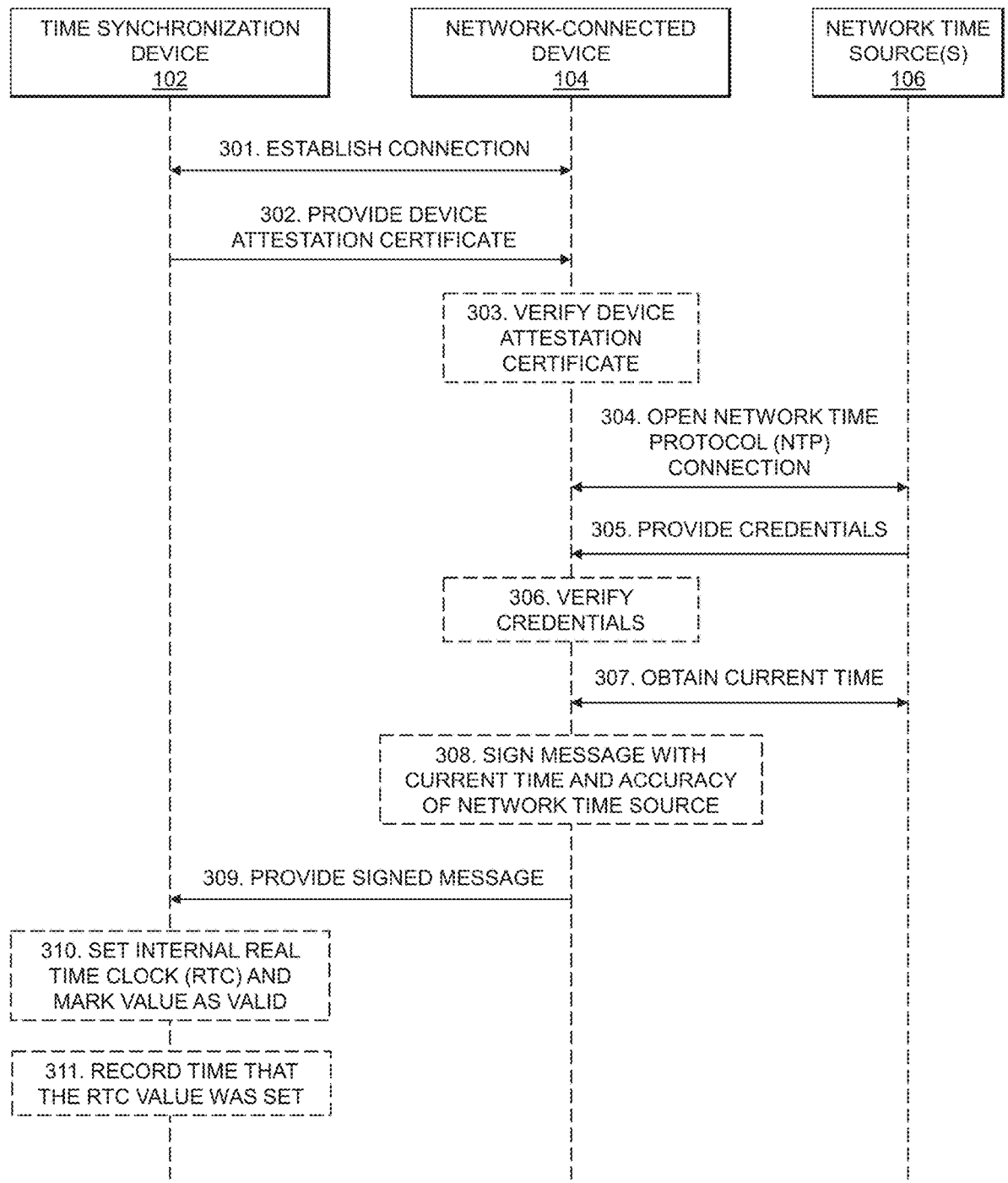
FIG. 3 shows a process flow for timing information acquisition by a time synchronization device in an illustrative embodiment.

Timing information acquisition will now be described in further detail with respect to FIG. 3. For timing information acquisition, a user plugs the time synchronization device 102 into one of the network-connected devices 104 (e.g., one which is connected via the Internet or another network to one or more of the network time sources 106). The time synchronization device 102 and the network-connected device 104 then utilize the network time acquisition logic 120 and 140 to perform timing information acquisition. In step 301, the time synchronization device 102 establishes a connection with the network-connected device 104 (e.g., by plugging the connector 207 of the time synchronization device 102 into a suitable port of the network-connected device 104).

Upon initial startup, the time synchronization device 102 will read and provide its Device Attestation Certificate to the network-connected device 104 in step 302. The network-connected device 104 verifies the received Device Attestation Certificate in step 303. Verification of the Device Attestation Certificate may include verifying a manufacturer's public key from the Device Attestation Certificate (e.g., at a Uniform Resource Locator (URL) given in the Device Attestation Certificate). In some embodiments, the verification may include assuring that only specific time synchronization devices from specific manufacturers can be used. This can be done by blacklisting or whitelisting URLs or domains. The network-connected device 104, as part of verification of the Device Attestation Certificate in step 303, may also record the public key of the Device Key Pair of the time synchronization device 102. It should be noted that the public key of the Device Key Pair of the time synchronization device 102 may also be conveyed separately to the endpoint devices 108 (e.g., at manufacture thereof), such that the endpoint devices 108 will only trust timing information from the time synchronization device 102.

In step 304, the network-connected device 104 opens an NTP connection to a specified one of the network time sources 106. The specified network time source 106 provides credentials to the network-connected device 104 in step 305. The credentials may include, for example, TLS credentials. In step 306, the network-connected device 104 verifies the received credentials to determine whether the specified network time source 106 is genuine. Once the credentials are verified, the network-connected device 104 obtains timing information (e.g., a current time) from the specified network time source 106 in step 307. In step 308, the network-connected device 104 signs a message (e.g., a "timing" certificate) with the timing information (e.g., the current time) as well as a believed or determined accuracy of the specified network time source 106. The signed message is then provided from the network-connected device 104 to the time synchronization device 102 in step 309. The signed message may be provided through a custom protocol (e.g., over an emulated serial device), as a file which is read by the time synchronization device 102, etc. It should be noted that steps 304 through 309 may be performed at least partially at or by the time synchronization device 102 rather than the network-connected device 104.

The time synchronization device 102 in step 310, after reception of the signed message (the signed timing certificate), sets its internal RTC to that of the received time and marks the time value as "valid." In step 311, the time synchronization device 102 also records the time at which the RTC itself was set.

After the time synchronization device 102 has acquired timing information, it can be unplugged from the network-connected device 104. The time synchronization device 102 then uses its internal timekeeping logic 122 to maintain the time measurement of its internal RTC as powered by the battery 201 and/or the capacitor 203. In some embodiments, failure of the battery 201 and/or capacitor 203 (e.g., charge of the time synchronization device 102) would stop the RTC and invalidate the acquired timing information within (e.g., the time is marked as "invalid").

Figure 4:
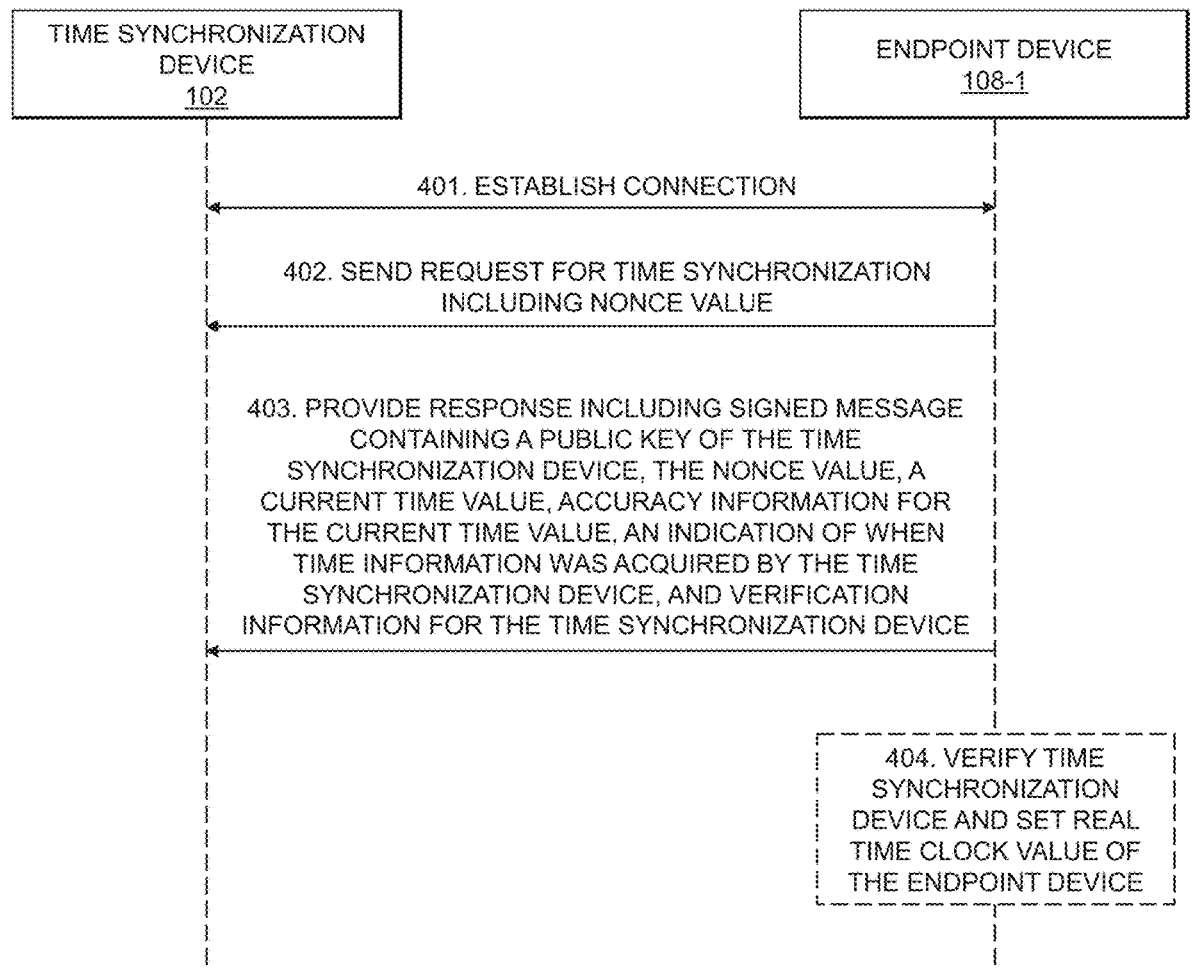
FIG. 4 shows a process flow for timing information delivery by a time synchronization device in an illustrative embodiment.

Timing information delivery will now be described in further detail with respect to FIG. 4. For timing information delivery, a user plugs the time synchronization device 102 into one of the endpoint devices 108 (e.g., endpoint device 108-1). The time synchronization device 102 and the endpoint device 108-1 then utilize the time synchronization processing logic 124, the time synchronization request logic 180 and the time synchronization verification logic 182 to perform timing information delivery. In step 401, the time synchronization device 102 establishes a connection with the endpoint device 108-1 (e.g., by plugging the connector 207 of the time synchronization device 102 into a suitable port of the endpoint device 108-1). Here, the endpoint device 108-1 is assumed to be an "offline" system, or one which is disconnected from a greater network infrastructure and thus cannot establish a direct network connection to the network time sources 106.

In step 402, the endpoint device 108-1 requests timing information from the time synchronization device 102. The step 402 request, referred to as a time synchronization request, may send a nonce value (e.g., one-time generated random data). The time synchronization device 102 responds to the endpoint device 108-1 in step 403. The step 403 response, referred to as a time synchronization response, may be a cryptographically signed message (e.g., a "timing information synchronization" certificate) which has been signed with the private key of the Device Key Pair of the time synchronization device 102. In some embodiments, the cryptographically signed message includes: the public key of the Device Key Pair of the time synchronization device 102; the nonce value that was sent with the time synchronization request; the current time (e.g., if the internal RTC of the time synchronization device 102 is marked as "valid"); a statement attesting to the accuracy of the current time; the reported accuracy of the original timing information acquired by the time synchronization device 102; the time at which the timing information was acquired by the time synchronization device 102; and a cryptographically signed message or certificate signed by a well-known key from a manufacturer of the time synchronization device 102 indicating the device manufacturer's certificate and the public key of the Device Key Pair of the time synchronization device 102.

In step 404, the endpoint device 108-1 verifies the signed message received in step 403. Such verification includes the endpoint device 108-1 verifying that it is indeed talking to the holder of the stated public key of the Device Key Pair of the time synchronization device 102 by verifying that the nonce value sent in step 402 was signed by the holder of the private key of the Device Key Pair of the time synchronization device 102. If the timing information was reported as "valid" it may be used as a RTC reference for the endpoint device 108-1. In some embodiments, the endpoint device 108-1 may implement additional rules or policies for verifying the timing information received in step 403. Such rules may include: only allowing timing information which was acquired within a given time period; estimating the accuracy of the received timing information (e.g., based upon the accuracy of the timing information as reported by the time synchronization device 102, the accuracy of the original time as reported at acquisition and which is stored on and reported by the time synchronization device 102, and any other internal timing accuracy determinations as implemented by the endpoint device 108-1); allowing only times which are believed or determined to have at least a threshold accuracy; etc.

The endpoint device 108-1 may determine the legitimacy of the timing information received in step 403 using different approaches, which may be implementation or configuration defined. In one approach, the endpoint device 108-1 blindly trusts the time value given in the step 403 response. In another approach, the endpoint device 108-1 is assumed to have previously been given an instruction (e.g., out-of-band) to trust the time synchronization device 102 with the public key of the Device Key Pair. The endpoint device 108-1, as described above, may verify that the nonce value sent in step 402 was signed by the holder of the corresponding private key of the Device Key Pair of the time synchronization device 102 to verify that the timing information in step 403 was correct. In another approach, the endpoint device 108-1 is assumed to have been previously given an instruction (e.g., out-of-band) to trust timing information from the time synchronization device 102 based on a manufacturer certificate. In this approach, the step 403 response must include the manufacturer's public key in such an instruction, such that the endpoint device 108-1 is able to validate: the manufacturer's public key it was told to trust was the same one as reported from the time synchronization device 102; that statement of the public key of the Device Key Pair of the time synchronization device 102 was verifiably signed by the manufacturer thereof such that the time synchronization device 102 is assumed to be genuine; and that the nonce value sent in the step 402 request was signed by the time synchronization device 102 holding the private key of the Device Key Pair, such that the timing information came from it and was reported as a result of the step 402 request.

Time zone settings for the endpoint devices 108 may be done or conveyed using various techniques, including as part of the timing information delivered via the time synchronization device 102.

Figure 5:
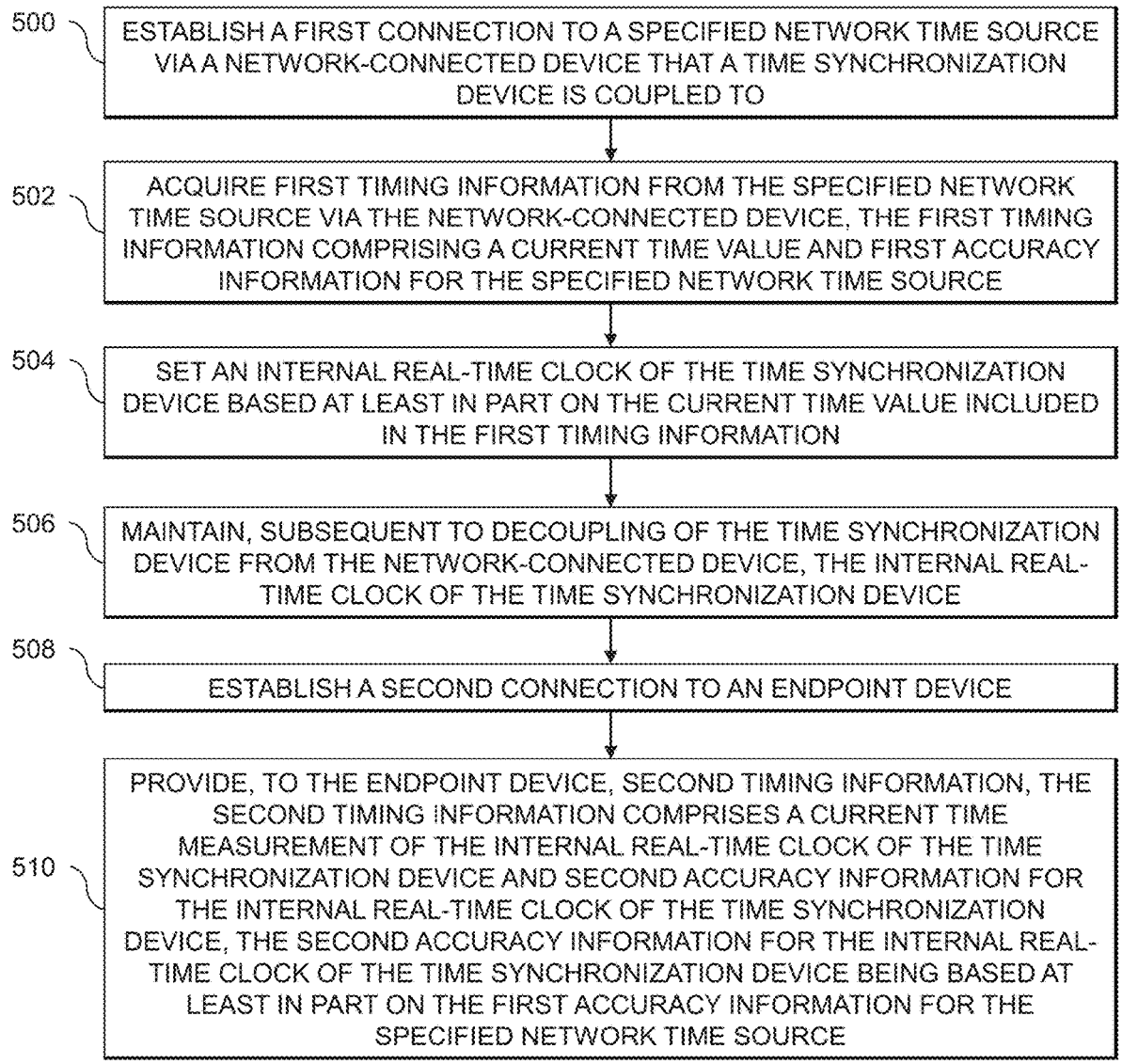
FIG. 5 is a flow diagram of an exemplary process for providing timing information acquired from network time sources to endpoint devices in an illustrative embodiment.

An exemplary process for providing timing information acquired from network time sources to endpoint devices will now be described in more detail with reference to the flow diagram of FIG. 5. It is to be understood that this particular process is only an example, and that additional or alternative processes for providing timing information acquired from network time sources to endpoint devices may be used in other embodiments.

In this embodiment, the process includes steps 500 through 510. These steps are assumed to be performed by the time synchronization device 102 utilizing the network time acquisition logic 120, the internal timekeeping logic 122 and the time synchronization processing logic 124. The process begins with step 500, establishing a first connection to a specified network time source (e.g., one of network time sources 106) via a network-connected device (e.g., one of the network-connected devices 104) that the time synchronization device 102 is coupled to. The time synchronization device 102 in step 502 acquires first timing information from the specified network time source 106 via the network-connected device 104, the first timing information comprising a current time value and first accuracy information for the specified network time source 106. In step 504, an internal RTC of the time synchronization device 102 is set based at least in part on the current time value included in the first timing information. The time synchronization device 102, subsequent to decoupling from the network-connected device 104, maintains the internal RTC in step 506.

In step 508, the time synchronization device 102 establishes a second connection to an endpoint device (e.g., one of the endpoint devices 108, such as endpoint device 108-1). The endpoint device 108-1 may be part of an air-gapped IT infrastructure 107 not configured for network connection to the specified network time source 106. The time synchronization device 102 in step 510 provides to the endpoint device 108-1 second timing information. The second timing information comprises a current time measurement of the internal RTC of the time synchronization device 102 and second accuracy information for the internal RTC of the time synchronization device 102. The second accuracy information for the internal RTC of the time synchronization device 102 is based at least in part on the first accuracy information for the specified network time source 106.

The time synchronization device 102 may comprise a microcontroller (e.g., 205) implementing the internal RTC, a connector (e.g., 207) configured for removable attachment to a port of the network-connected device 104 and a port of the endpoint device 108-1, and a power source providing power to the microcontroller when the connector is detached from the port of the network-connected device and the port of the endpoint device. The power source may comprise at least one of a battery (e.g., 201) and a capacitor (e.g., 203). The connector may comprise a USB connector, and the port of the network-connected device 104 and the port of the endpoint device 108-1 may comprise respective USB ports.

In some embodiments, step 500 comprises providing, to the network-connected device 104, a device attestation certificate, the device attestation certificate being signed using a private key of a trusted party (e.g., a manufacturer of the time synchronization device 102) and containing a public key of the time synchronization device 102. Step 500 may utilize an NTP connection between the network-connected device 104 and the specified network time source 106.

Step 502 may comprise receiving a cryptographically signed message indicating the current time value and the first accuracy information for the specified network time source 106 and verifying the cryptographically signed message. Step 504 may be performed responsive to a successful verification of the cryptographically signed message. Step 504 may include recording a time at which the internal RTC is set based at least in part on the current time value obtained from the specified network time source 106 in the first timing information and marking the internal RTC as valid. Step 506 may comprise marking the internal RTC as invalid responsive to detecting failure of a power source (e.g., 201 and/or 203) that powers the internal RTC when the time synchronization device 102 is decoupled from the network-connected device 104 and the endpoint device 108-1.

Step 508 may comprise receiving, from the endpoint device 108-1, a nonce value, where the second timing information provided to the endpoint device 108-1 in step 510 comprises the nonce value. The second timing information may comprise a message that is cryptographically signed by a trusted party, the message comprising a cryptographic certificate of a manufacturer of the time synchronization device 102 and a public key of the time synchronization device 102. The second accuracy information for the internal RTC of the time synchronization device 102 included in the second timing information may comprise a reported accuracy of the current time value obtained from the specified network time source 106 in the first timing information, and a time at which the internal RTC of the time synchronization device 102 was set based at least in part on the current time value obtained from the specified network time source 106 in the first timing information. The second accuracy information for the internal RTC of the time synchronization device 102 included in the second timing information may also or alternatively comprise a statement attesting to an accuracy of the internal RTC of the time synchronization device 102.

Illustrative embodiments provide technical solutions for reliably and securely synchronizing time to systems which are disconnected from any network time sources. The technical solutions described herein also enable time synchronization to be physically performed by an untrusted party, and using simple, low-cost hardware. The technical solutions described herein also enable effective time synchronization from devices which are not special, purpose-built precision timekeeping devices. Instead, low-cost hardware devices with poorer timekeeping abilities may be used by establishing limits around their operational allowances. Conventional approaches for time synchronization such as NTP and NTP over TLS do not work for offline, disconnected endpoint devices. Further, implementing high-reliability physical clocks or devices in such disconnected endpoint devices is an expensive approach, and can be spoofed. GPS-based approaches require radio reception, and both signals and the GPS devices themselves can be spoofed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for providing timing information acquired from network time sources to endpoint devices will now be described in greater detail with reference to FIGS. 6 and 7. Although described in the context of system 100, these platforms may also be used to implement at least portions of other information processing systems in other embodiments.

Figure 6:
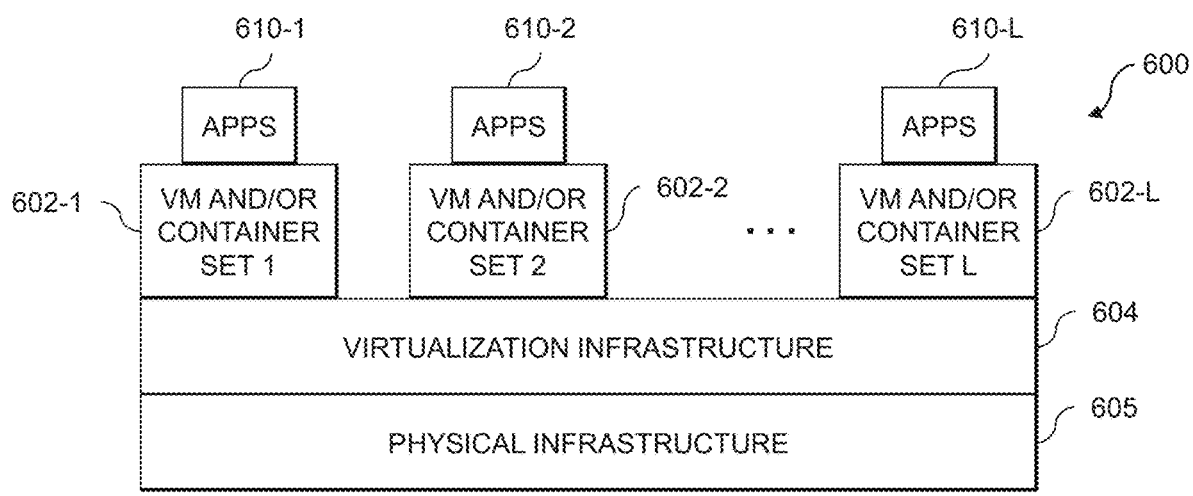
FIGS. 6 and 7 show examples of processing platforms that may be utilized to implement at least a portion of an information processing system in illustrative embodiments.
Figure 7:
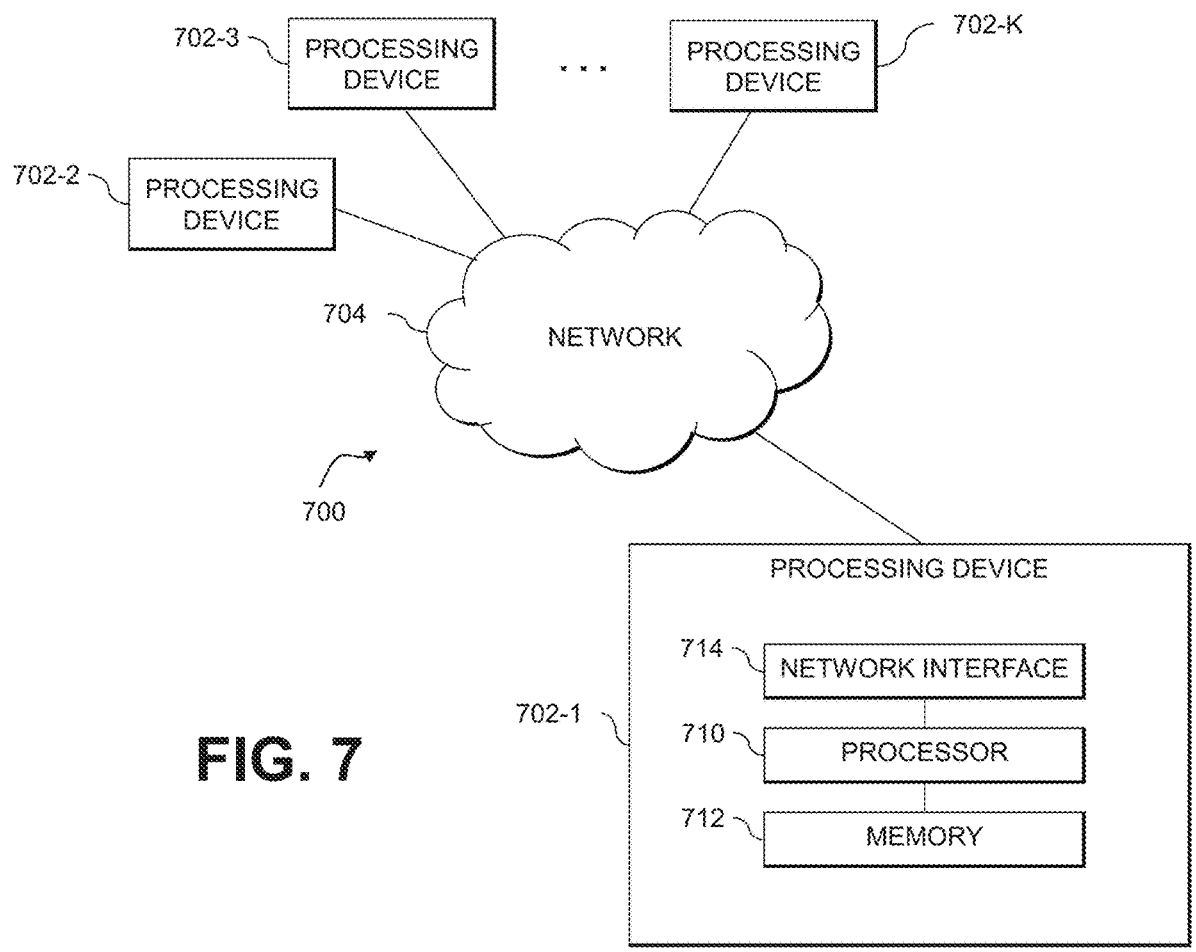

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for providing timing information acquired from network time sources to endpoint devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, time sources, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   establishing a first connection to a specified network time source via a network-connected device that the at least one processing device is coupled to;
   acquiring first timing information from the specified network time source via the network-connected device, the first timing information comprising a current time value and first accuracy information for the specified network time source;
   setting an internal real-time clock of the at least one processing device based at least in part on the current time value included in the first timing information;
   maintaining, subsequent to decoupling of the at least one processing device from the network-connected device, the internal real-time clock of the at least one processing device;
   establishing a second connection to an endpoint device; and
   providing, to the endpoint device, second timing information, the second timing information comprising a current time measurement of the internal real-time clock of the at least one processing device and second accuracy information for the internal real-time clock of the at least one processing device, the second accuracy information for the internal real-time clock of the at least one processing device being based at least in part on the first accuracy information for the specified network time source.

2. The apparatus of claim 1 further comprising:
   a microcontroller implementing the internal real-time clock of the at least one processing device;
   a connector configured for removable attachment to a port of the network-connected device and a port of the endpoint device; and
   a power source providing power to the microcontroller when the connector is detached from the port of the network-connected device and the port of the endpoint device.

3. The apparatus of claim 2 wherein the power source comprises at least one of a battery and a capacitor.

4. The apparatus of claim 2 wherein the connector comprises a Universal Serial Bus (USB) connector, and wherein the port of the network-connected device and the port of the endpoint device comprise respective USB ports.

5. The apparatus of claim 1 wherein establishing the first connection to the specified network time source via the network-connected device comprises providing, to the network-connected device, a device attestation certificate, the device attestation certificate being signed using a private key of a trusted party and containing a public key of the at least one processing device.

6. The apparatus of claim 1 wherein establishing the first connection to the specified network time source via the network-connected device comprises utilizing a Network Time Protocol (NTP) connection between the network-connected device and the specified network time source.

7. The apparatus of claim 1 wherein:
   acquiring the first timing information from the specified network time source via the network-connected device comprises:
   receiving a cryptographically signed message indicating the current time value and the first accuracy information for the specified network time source; and
   verifying the cryptographically signed message; and
   setting the internal real-time clock of the at least one processing device is performed responsive to a successful verification of the cryptographically signed message.

8. The apparatus of claim 1 wherein setting the internal real-time clock of the at least one processing device comprises:
   recording a time at which the internal real-time clock is set based at least in part on the current time value obtained from the specified network time source in the first timing information; and
   marking the internal real-time clock as valid.

9. The apparatus of claim 8 wherein maintaining the internal real-time clock comprises marking the internal real-time clock as invalid responsive to detecting failure of a power source that powers the internal real-time clock when the at least one processing device is decoupled from the network-connected device and the endpoint device.

10. The apparatus of claim 1 wherein:
    establishing the second connection to the endpoint device comprises receiving, from the endpoint device, a nonce value; and
    the second timing information provided to the endpoint device comprises the nonce value.

11. The apparatus of claim 1 wherein the second timing information comprises a message that is cryptographically signed by a trusted party, the message comprising a cryptographic certificate of a manufacturer of the at least one processing device and a public key of the at least one processing device.

12. The apparatus of claim 1 wherein the second accuracy information for the internal real-time clock of the at least one processing device included in the second timing information comprises:
a reported accuracy of the current time value obtained from the specified network time source in the first timing information; and
a time at which the internal real-time clock of the at least one processing device was set based at least in part on the current time value obtained from the specified network time source in the first timing information.

13. The apparatus of claim 1 wherein the second accuracy information for the internal real-time clock of the at least one processing device included in the second timing information comprises a statement attesting to an accuracy of the internal real-time clock of the at least one processing device.

14. The apparatus of claim 1 wherein the endpoint device is part of an air-gapped information technology infrastructure not configured for network connection to the specified network time source.

15. A computer program product comprising a non-transitory processor-readable storage medium having stored therein program code of one or more software programs, wherein the program code when executed by at least one processing device causes the at least one processing device to perform steps of:
establishing a first connection to a specified network time source via a network-connected device that the at least one processing device is coupled to;
acquiring first timing information from the specified network time source via the network-connected device, the first timing information comprising a current time value and first accuracy information for the specified network time source;
setting an internal real-time clock of the at least one processing device based at least in part on the current time value included in the first timing information;
maintaining, subsequent to decoupling of the at least one processing device from the network-connected device, the internal real-time clock of the at least one processing device;
establishing a second connection to an endpoint device; and
providing, to the endpoint device, second timing information, the second timing information comprising a current time measurement of the internal real-time clock of the at least one processing device and second accuracy information for the internal real-time clock of the at least one processing device, the second accuracy information for the internal real-time clock of the at least one processing device being based at least in part on the first accuracy information for the specified network time source.

16. The computer program product of claim 15 wherein:
setting the internal real-time clock of the at least one processing device comprises:
recording a time at which the internal real-time clock is set based at least in part on the current time value obtained from the specified network time source in the first timing information; and
marking the internal real-time clock as valid; and
maintaining the internal real-time clock comprises marking the internal real-time clock as invalid responsive to detecting failure of a power source that powers the internal real-time clock when the at least one processing device is decoupled from the network-connected device and the endpoint device.

17. The computer program product of claim 15 wherein the second accuracy information for the internal real-time clock of the at least one processing device included in the second timing information comprises:
a reported accuracy of the current time value obtained from the specified network time source in the first timing information; and
a time at which the internal real-time clock of the at least one processing device was set based at least in part on the current time value obtained from the specified network time source in the first timing information.

18. A method comprising:
establishing a first connection to a specified network time source via a network-connected device that at least one processing device is coupled to;
acquiring first timing information from the specified network time source via the network-connected device, the first timing information comprising a current time value and first accuracy information for the specified network time source;
setting an internal real-time clock of the at least one processing device based at least in part on the current time value included in the first timing information;
maintaining, subsequent to decoupling of the at least one processing device from the network-connected device, the internal real-time clock of the at least one processing device;
establishing a second connection to an endpoint device; and
providing, to the endpoint device, second timing information, the second timing information comprising a current time measurement of the internal real-time clock of the at least one processing device and second accuracy information for the internal real-time clock of the at least one processing device, the second accuracy information for the internal real-time clock of the at least one processing device being based at least in part on the first accuracy information for the specified network time source;
wherein the method is performed by at least one processing device comprising a processor coupled to a memory.

19. The method of claim 18 wherein:
setting the internal real-time clock of the at least one processing device comprises:
recording a time at which the internal real-time clock is set based at least in part on the current time value obtained from the specified network time source in the first timing information; and
marking the internal real-time clock as valid; and
maintaining the internal real-time clock comprises marking the internal real-time clock as invalid responsive to detecting failure of a power source that powers the internal real-time clock when the at least one processing device is decoupled from the network-connected device and the endpoint device.

20. The method of claim 18 wherein the second accuracy information for the internal real-time clock of the at least one processing device included in the second timing information comprises:
a reported accuracy of the current time value obtained from the specified network time source in the first timing information; and a time at which the internal real-time clock of the at least one processing device was set based at least in part on the current time value obtained from the specified network time source in the first timing information.

* * * * *